(12) United States Patent
Blais et al.

(10) Patent No.: US 6,505,344 B1
(45) Date of Patent: Jan. 7, 2003

(54) OBJECT ORIENTED APPARATUS AND METHOD FOR ALLOCATING OBJECTS ON AN INVOCATION STACK

(75) Inventors: Marc Noel Blais, Rochester, MN (US); William Jon Schmidt, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/481,929

(22) Filed: Jan. 12, 2000

(51) Int. Cl.$^7$ .................................................. G06F 9/45
(52) U.S. Cl. .................. 717/151; 717/151; 717/140; 717/148; 717/156; 717/157; 707/206; 711/132; 711/170
(58) Field of Search ................................ 717/151, 155, 717/156, 157, 148, 108, 116, 153, 165, 118, 140, 141; 707/206; 709/104; 711/132, 170

(56) References Cited

U.S. PATENT DOCUMENTS

| | | | | | |
|---|---|---|---|---|---|
| 5,157,777 | A | * | 10/1992 | Lai et al. ...................... | 711/117 |
| 6,192,517 | B1 | * | 2/2001 | Agesen et al. ............... | 717/154 |
| 6,199,075 | B1 | * | 3/2001 | Ungar et al. .................. | 707/10 |
| 6,226,789 | B1 | * | 5/2001 | Tye et al. .................... | 717/138 |
| 6,263,491 | B1 | * | 7/2001 | Hunt ........................ | 717/130 |
| 6,317,869 | B1 | * | 11/2001 | Adl-Tabatabai et al. .... | 707/206 |
| 6,381,735 | B1 | * | 4/2002 | Hunt ........................... | 717/158 |

OTHER PUBLICATIONS

Title: Escape Analysis for Object Oriented Languages. Application to Java TM, author: Blanchet et al, ACM, 1999.*
Title: Optimizing Dynamic Memory Management in a Multithreaded Application Executing on a Multiprocessor, author: Haggander et al, IEEE, 1998.*
Title: Escape Analysis: Correctness Proof, Implementation and Experimental Results, author: Blanchet et al, ACM, 1998.*
Title: Storage Use Analysis and its Applications, author: Serrano et al, ACM, 1996.*
Title: Reference Escape Analysis: Optimizing Reference Counting based on the Lifetime of References, author: Park et al, ACM, 1991.*
Title: Compositional Pointer and Escape Analysis for Java Programs, author: Whaley et al, ACM, 1999.*
Gay and Steensgaard, "Stack Allocating Objects in Java", p. 1–10.
Choi et al., "Escape Analysis for Java", In Proceedings of the Conference on Object Oriented Programming, Systems, and Languages (OOPSLA), Denver, CO (Nov. 1999), p. 1–19.

* cited by examiner

*Primary Examiner*—Gregory Morse
*Assistant Examiner*—Chameli C. Das
(74) *Attorney, Agent, or Firm*—Martin & Associates, LLC; Derek P. Martin

(57) ABSTRACT

An object oriented mechanism and method allow allocating a greater number of objects on a method's invocation stack. Each instruction that creates an object (i.e., allocation instruction) is first analyzed to determine whether it is one of the following three types: no escape, global escape, and arg escape. If an allocation instruction is global escape, the object must be allocated from the heap. If an allocation instruction is no escape, it can be allocated on the method's invocation stack frame. If an allocation instruction is arg escape, further analysis is required to determine whether the object can be allocated on an invoking method's stack or must be allocated from the heap. If the method that contains an arg escape allocation instruction can be inlined into a method from which the lifetime of the object does not escape, the object can be allocated on the invoking method's stack. This inlining can be done for several layers up, if needed and possible. This allows for nested objects to be potentially allocated on a method's stack, instead of forcing each of these objects to be allocated from the heap.

21 Claims, 13 Drawing Sheets

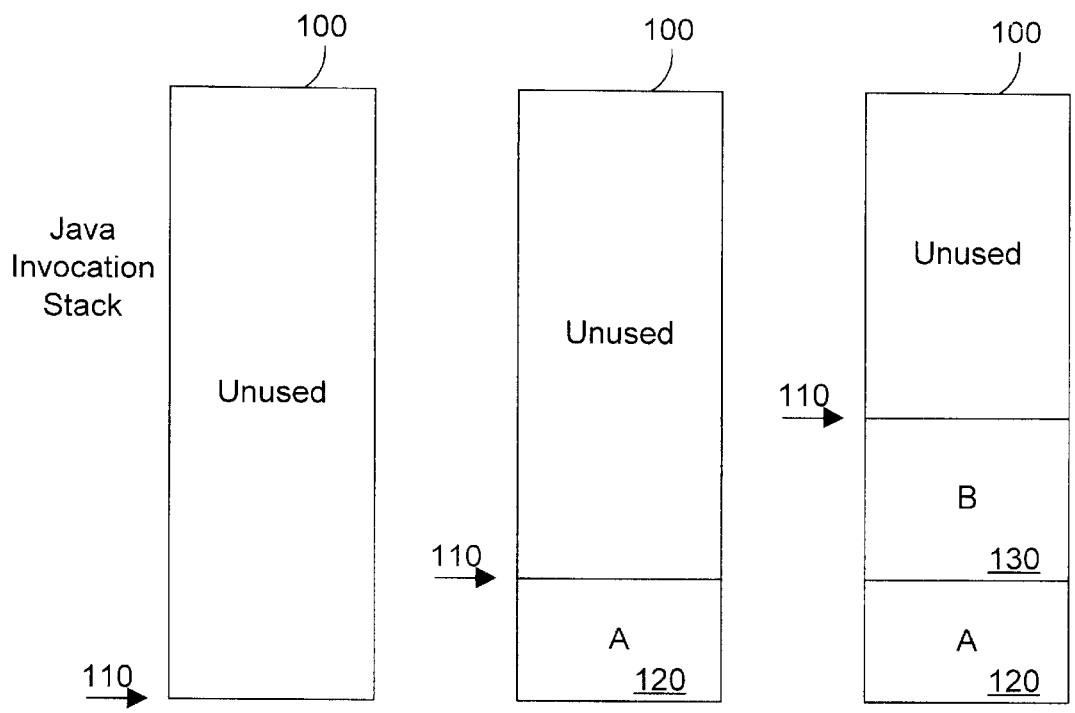
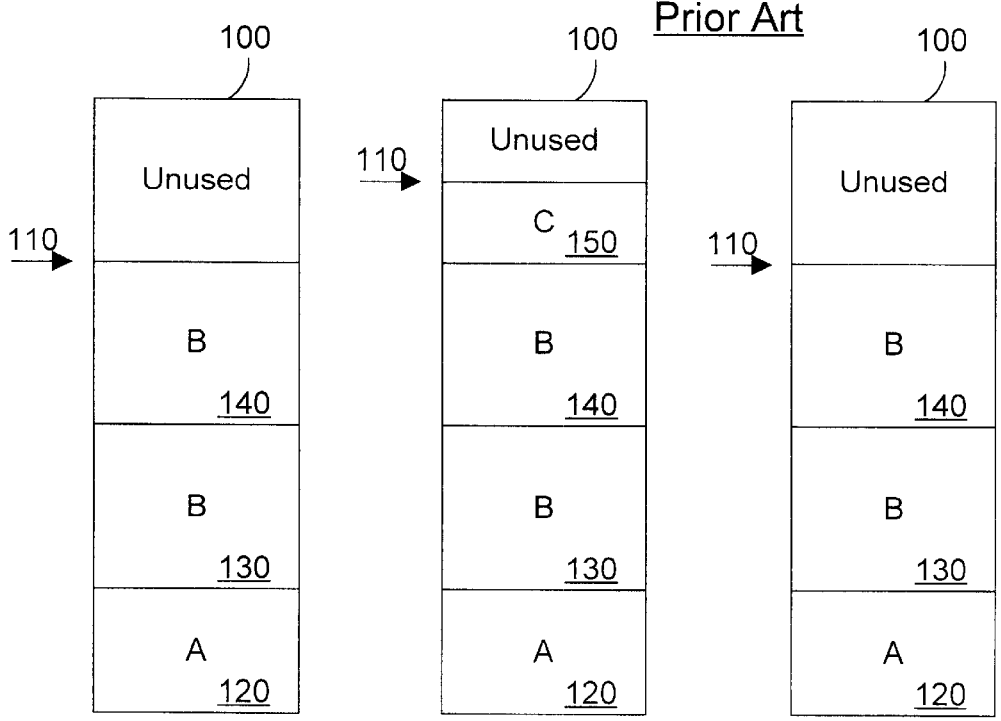
FIG. 1A  FIG. 1B  FIG. 1C
Prior Art
FIG. 1D  FIG. 1E  FIG. 1F C++
```
A() {
    Square k;
    .
    .
    .
}
```
FIG. 2A
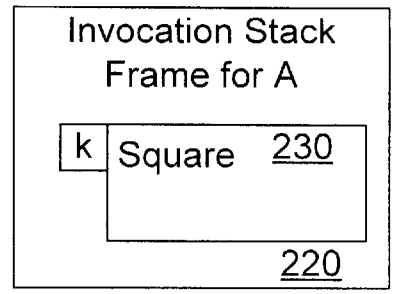
FIG. 2B
Java
```
A() {
    .
    .
    .
Square k = new Square();
    .
    .
    .
}
```
Prior Art
FIG. 3A
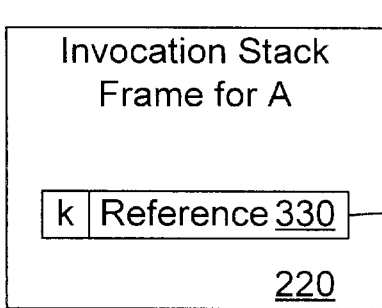
FIG. 3B
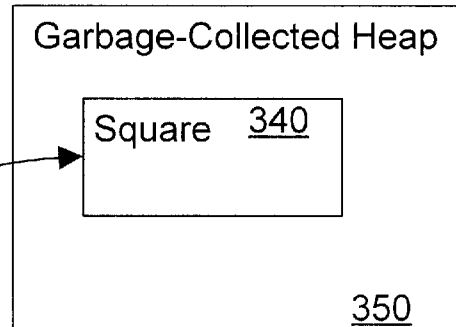
FIG. 3C A() {   NO ESCAPE
 •
 •
 •
Square k = new Square();
 •
 •
 •
} static Square classVar;
A() {   GLOBAL ESCAPE
 •
 •
 •
Square k = new Square();
classVar = k;
 •
 •
 •
}

Square A() {ARG ESCAPE
 •
 •
 •
Square k = new Square();
return k;
 •
 •
 •
}

A(List L) {   ARG ESCAPE
 •
 •
 •
Square k = new Square();
L.addToList(k);
 •
 •
 •
}

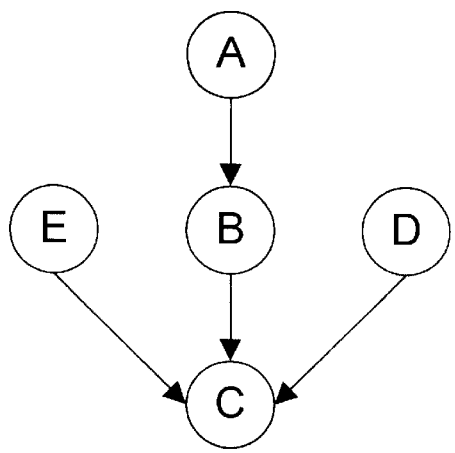

Assumptions:

There is an allocation instruction $O_C$ in C.
$O_C$ is Arg Escape in C via its first parameter.
Corresponding actual in E is Global Escape.
Corresponding actual in D is No Escape.
Corresponding actual $A_B$ in B is ArgEscape.
$A_B$ is reached by first formal parameter in B.
Corresponding actual in A is NoEscape.

```
public class SomeClass { static Vehicle classVehicle;

static void methodA() {
A1:     Vehicle refA = new Vehicle();
A2:     methodB(refA);
    } static void methodB(Vehicle parmB) {
B1:     methodC(parmB);
    } static void methodC(Vehicle parmC) {
C1:     parmC.eng = new Engine();
    } static void methodD() {
D1:     Vehicle refD = new Vehicle;
D2:     methodC(refD);
    } static void methodE{}
E1:     Vehicle refE = new Vehicle;
E2:     methodC(refE);
E3:     classVehicle = refE;
    }

| Method | Allocation Instruction | Inline Stack | Final Inline Stack |
|---|---|---|---|
| methodA | A1 | null | null |
| methodA | C1 | {[methodB,A2], [methodC,B1]} | N/A |
| methodB | C1 | {[methodC,B1]} | N/A |
| methodC | C1 | null | {[methodB,A2], [methodC,B1]} {[methodC,D2]} |
| methodD | C1 | {[methodC,D2]} | N/A |
| methodD | D1 | null | null |
| methodE | C1 | null | N/A |
| methodE | E1 | null | null |

FIG. 17

OBJECT ORIENTED APPARATUS AND METHOD FOR ALLOCATING OBJECTS ON AN INVOCATION STACK

BACKGROUND OF THE INVENTION

1. Technical Field

This invention generally relates to the data processing field. More specifically, this invention relates to the location of object creation in object oriented systems.

2. Background Art

Since the dawn of the computer age, computer systems have evolved into extremely sophisticated devices, and computer systems may be found in many different settings. Computer systems typically include a combination of hardware, such as semiconductors and circuit boards, and software, also known as computer programs. As advances in semiconductor processing and computer architecture push the performance of the computer hardware higher, more sophisticated computer software has evolved to take advantage of the higher performance of the hardware, resulting in computer systems today that are much more powerful than just a few years ago.

Computer systems typically include operating system software that controls the basic function of the computer, and one or more software application programs that run under the control of the operating system to perform desired tasks. For example, a typical IBM Personal Computer may run the OS/2 operating system, and under the control of the OS/2 operating system, a user may execute an application program, such as a word processor. As the capabilities of computer systems have increased, the application software programs designed for high performance computer systems have become extremely powerful. Additionally, software development costs have continued to rise because more powerful and complex programs take more time, and hence more money, to produce.

One way in which the performance of application software programs has been improved while the associated development costs have been reduced is by using object oriented programming concepts. The goal of using object oriented programming is to create small, reusable sections of program code known as "objects" that can be quickly and easily combined and re-used to create new programs. This is similar to the idea of using the same set of building blocks again and again to create many different structures. The modular and re-usable aspects of objects will typically speed development of new programs, thereby reducing the costs associated with the development cycle. In addition, by creating and re-using a comprehensive set of well-tested objects, a more stable, uniform, and consistent approach to developing new computer programs can be achieved.

The Java programming language developed by Sun Microsystems is one modem object oriented programming language that has become very popular in recent years. From a programmer's point of view, one of the advantages of the Java programming language is that memory allocation and reclamation are handled entirely by the run-time system, which relieves the programmer of the burden of determining how and when to destroy unneeded objects. All objects (other than those of primitive types) are allocated from a common "heap", or section of memory. The garbage collection mechanism then monitors the objects in the heap, and periodically deletes unneeded objects, thereby reclaiming portions of the heap that are occupied by objects that can no longer be accessed from the user's program.

One problem with the Java automatic allocation and reclamation of memory is that users have less control over their program's performance. Each time an object is allocated, a certain cost is incurred as the memory manager updates its data structures. Furthermore, an additional cost must be paid to reclaim the object during garbage collection. Although these costs are small when considered individually, the sheer frequency of object allocation and reclamation result in a significant portion of program execution time being spend in the memory manager, allocating and reclaiming memory for objects.

Java's memory management overhead is far greater than that of the C++ programming language, primarily because every Java object is allocated from the heap. In C++, programmers are given more control over the allocation of their objects. In particular, C++ programmers are able to declare objects to be local to a method. These objects come into existence when the method is invoked, and are automatically reclaimed when the method invocation terminates. Further, the run-time cost of allocating these objects is essentially zero, since they simply occupy space in the method's invocation stack frame. Adding an object to the invocation stack frame simply means that the amount by which the stack pointer is moved must increase, but no additional instructions are required to do this. Compare this with Java, where every created object, no matter how small or how temporary, requires overhead from the run-time memory manager.

Recently, researchers in compiler technology have been working on ways to allocate some Java objects on a method's stack frame, rather than going to the heap for each and every object, thereby improving on the performance of the native Java capabilities. In particular, if a compiler can automatically detect Java objects whose "lifetimes" do not extend beyond the method in which they are created, these objects can be automatically allocated on the stack by the compiler rather than from the garbage-collected heap, resulting in improved performance. The technology used to determine which objects may be allocated on the stack is called "escape analysis". The idea is to determine which objects have lifetimes that do not "escape" from the methods that create them. Escape analysis is presented in a paper by Choi et al., "Escape Analysis for Java", in Proceedings of the Conference on Object Oriented Programming, Systems, and Languages (OOPSLA), Denver, Colo. (November 1999), p. 1–19.

Escape analysis as described by Choi et al. is limited to allocating objects on a method's stack if their lifetimes do not escape from their creating method. However, there are a large class of Java objects which do escape from their creating method, and yet could be allocated on the stack if properly identified and managed. Without an apparatus and methods for allocating a greater number of Java objects to a method's call stack, the computer industry will continue to suffer undue performance limitations caused by allocating Java objects from the heap that could be allocated on a method's stack.

DISCLOSURE OF INVENTION

According to the preferred embodiments, an object oriented mechanism and method allow allocating a greater number of Java objects on a method's invocation stack. Each instruction that creates an object (i.e., allocation instruction) is first analyzed to determine whether it is one of the following three types: no escape, global escape, and arg escape. If an allocation instruction is global escape, the object must be allocated from the heap. If an allocation instruction is no escape, it can be allocated on the method's stack. If an allocation instruction is arg escape, further analysis is required to determine whether the object can be allocated on an invoking method's stack or must be allocated from the heap. If the method that contains an arg escape allocation instruction can be inlined into a method from which the lifetime of the object does not escape, the object can be allocated on the invoking method's stack. This inlining can be done for several layers up, if needed and possible. This allows for nested objects to be potentially allocated on a method's stack, instead of forcing each of these objects to be allocated from the heap.

BRIEF DESCRIPTION OF DRAWINGS

The preferred exemplary embodiments of the present invention will hereinafter be described in conjunction with the appended drawings, where like designations denote like elements, and:

FIGS. 1A–1F are each block diagram representations of a prior art invocation stack in various states;

FIG. 2A is a diagram of C++ pseudo-code;

FIG. 2B is a block diagram showing the object allocation for the C++ code of FIG. 2A;

FIG. 3A is a diagram of Java pseudo-code;

FIGS. 3B and 3C are block diagrams that show the object allocation for the Java code of FIG. 3A;

FIG. 13 is a simplified diagram of a live call graph for a sample program to illustrate the concepts of the present invention;

FIG. 14 lists assumptions for the program that produces the live call graph of FIG. 13;

FIG. 15 is Java pseudo-code of a program with methods that satisfy the live call graph of FIG. 13 and assumptions in FIG. 14;

FIG. 17 is a table showing the inline stacks for the methods represented in the connection graphs of FIGS. 16A–16E.

BEST MODE FOR CARRYING OUT THE INVENTION

Figures 4, 5A, 5B, 5C, 5D:
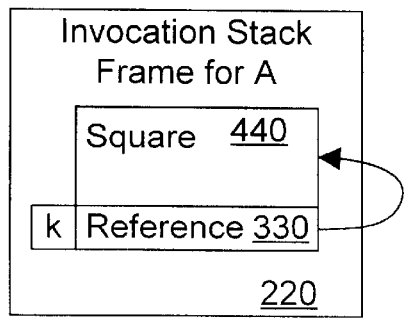
FIG. 4 is a block diagram showing the allocation of a Java object on an invocation stack frame.
FIGS. 5A–5D are diagrams that show Java pseudo-code examples for no escape, global escape, and arg escape.

The present invention relates to object oriented programming techniques. For those individuals who are not generally familiar with object oriented programming, the Overview section below presents many of the concepts that will help to understand the invention.

1. OVERVIEW

Object Oriented Technology v. Procedural Technology

Object oriented programming is a method of implementation in which programs are organized as cooperative collections of objects, each of which represents an instance of some class, and whose classes are all members of a hierarchy of classes united via inheritance relationships. Object oriented programming differs from standard procedural programming in that it uses objects, not algorithms, as the fundamental building blocks for creating computer programs. This difference stems from the fact that the design focus of object oriented programming technology is wholly different than that of procedural programming technology.

The focus of procedural-based design is on the overall process that solves the problem; whereas, the focus of object oriented design is on how the problem can be broken down into a set of autonomous entities that can work together to provide a solution. The autonomous entities of object oriented technology are, of course, objects. Said another way, object oriented technology is significantly different from procedural technology because problems are broken down into sets of cooperating objects instead of into hierarchies of nested computer programs or procedures.

Thus, a pure object oriented program is made up of code entities called objects. Each object is an identifiable, encapsulated piece of code that provides one or more services when requested by a client. Conceptually, an object has two parts, an external object interface and internal object data. In particular, all data is encapsulated by the object interface such that other objects must communicate with that object through its object interface. The only way to retrieve, process or otherwise operate on the encapsulated data is through the methods defined on the object. This protects the internal data portion of the object from outside tampering. Additionally, because outside objects have no access to the internal implementation of an object, that internal implementation can change without affecting other aspects of the program.

In this way, the object system isolates the requester of services (client objects) from the providers of services (server objects) by a well defined encapsulating interface. Thus, in the classic object model, a client object sends request messages (e.g., method calls) to server objects to perform any necessary or desired function. The message identifies a particular server object and specifies what method is to be performed by the server object, and also supplies any required parameters. The server object receives and interprets the message, and can then determine what service to perform.

Because all operations on an object are expressed as methods called from one object to another, methods can be called by objects in other processes. Objects that reside in one process and that are capable of calling methods on an object in another process (such as a process on a remote computer system) are known as distributed objects.

Many distributed object systems allow interaction between objects in remote locations over a communications link. In a distributed object system a "client object" in one location calls methods on a "server object" in another location, which may be a remote location. The client object—server object interactions form the basis for the distributed object system.

Another central concept in object oriented programming is the class. A class is a template that defines a type of object. A class outlines the makeup of objects that belong to that class. By defining a class, objects can be created that belong to the class without having to rewrite the entire definition for each new object as it is created. This feature of object oriented programming promotes the reusability of existing definitions and promotes efficient use of program code. Each class has corresponding configuration data that determines the features or attributes of the class. Changing the configuration data for a class changes the existing class to a new class.

There are many computer languages that presently support object oriented programming techniques. For example, Smalltalk, Object Pascal, C++ and Java are all examples of programming languages that support object oriented programming to one degree or another.

Java Programming Language

Java is a modern object oriented programming language designed by Sun Microsystems that has grown in popularity in recent years. Java offers many features and advantages that makes it a desirable programming language to use. First, Java is specifically designed to create small application programs, commonly called "applets," that can reside on the network in centralized servers, and which are delivered to the client machine only when needed. Second, Java is completely platform independent. A Java program can be written once and can then run on any type of platform that contains a Java Virtual Machine (JVM). The JVM model is supported by most computer vendors, thereby allowing a software vendor to have access to hardware and software systems produced by many different companies. Finally, Java is an object oriented language, meaning that software written in Java can take advantage of the benefits of object oriented programming techniques.

As in other object oriented systems, operations in Java are performed by one object calling a method on another object. These objects can reside locally on the same machine or on separate JVM's physically located on separate computers or systems.

Invocation Stacks in Java

The Java programming language defines one or more invocation stacks that are used to store information when a method is called (or invoked). FIG. 1 shows various views of an invocation stack 100 in different states. Referring to FIG. 1A, invocation stack 100 is shown before any methods are invoked, with its stack pointer 110 at the bottom of the stack. Entries are stored on the stack bottom up. Note that the stack pointer could equally be at the top of the stack, with the entries stored on the stack top down. FIG. 1B illustrates what happens when method A is invoked. An invocation stack frame 120 for A is pushed on the stack, and the stack pointer 110 is then moved to the next available location on the stack.

An invocation stack frame can contain many different types of data. For example, an invocation stack frame can contain the stored state of all processor registers when the method was invoked, so that some or all of these values can be restored when the method has completed. An invocation stack frame can also contain storage for any variables that are local to the method. Thus, if an integer m is declared as a local variable, the invocation stack frame would contain the memory allocation for m. The prior art recognized that object invocations whose lifetimes do not escape the invoking method may also be stored on the stack frame as well.

Referring to FIG. 1C, we assume that in the execution of method A, method B is invoked, so the stack frame 130 for method B is pushed on the invocation stack 100, and the stack pointer 110 is moved to the next available location. We assume that method B calls itself, which causes another instance 140 of a stack frame for method B to be stored on the invocation stack 100, with the stack pointer 110 moved to the next available location, as shown in FIG. 1D. We assume that the second invocation of method B then calls method C, so the stack frame 150 for method C is then pushed onto the invocation stack and stack pointer 110 is moved to the next available location. At this point we assume that method C does not call any other methods, and runs to completion. This causes the stack pointer 110 to move down to the beginning of the stack frame for method C, effectively reclaiming the area of the invocation stack 100 that was used for stack frame 150. The example illustrated in FIGS. 1A–1F (and especially in FIG. 1F) makes it clear that allocating an object on a stack frame does not create any additional overhead. It may require that stack pointer 110 move a little farther to make room for the object, but this does not create any run-time performance penalty. Because of this, the more objects we can allocate to the invocation stack, the better the performance of the resulting code will be.

A difference between C++ and Java is illustrated in FIGS. 2 and 3. Referring to FIG. 2A, we assume that a "square" is a name of a particular type of object. A programmer in C++ can declare a variable as being of a "type" that is an object. As shown in FIG. 2A, the statement "Square k" is a declaration of a variable "k" that is of the type "Square", which is an object. When a variable is defined as an object, as in FIG. 2A, the object can be allocated directly on the invocation stack frame for the method, as shown in FIG. 2B. The Square object 230 that corresponds to k is stored on the invocation stack frame 220 for A.

In Java, variables do not denote objects, but instead denote references (i.e., pointers) to objects. Referring to FIG. 3A, the declaration Square k=new Square( ) is a statement that says that variable k is a reference to a new object of type Square. Only the reference 330 (representing k) is stored in the stack frame 220 for the method, as shown in FIG. 3B; the Square object 340 pointed to by reference 330 is allocated from the heap 350, as shown in FIG. 3C.

Prior Art Escape Analysis

The "escape analysis" performed by Choi et al. in "Escape Analysis for Java", in Proceedings of the Conference on Object Oriented Programming, Systems, and Languages (OOPSLA), Denver, Colo. (November 1999), p. 1–19, determines whether the lifetime of an object "escapes" the method that creates the object. If not, the object itself 440 can be allocated on the stack, as shown in FIG. 4. Even though k is still a reference 330, the object 440 to which it points can also be stored on the invocation stack frame 220 for the method that creates the object 440. As described above with reference to FIG. 1, allocating objects to a method's invocation stack frame significantly enhances performance of the computer program.

Examples of Java pseudo-code are presented in FIGS. 5A–5D to illustrate examples of allocation instructions that are "no escape" (FIG. 5A), "global escape" (FIG. 5B), and "arg escape" (FIGS. 5C and 5D). In FIG. 5A, a variable k is defined as a reference to a new object of type Square, but we assume that the lifetime of the allocated object referenced by k does not escape method A. The prior art Choi approach allocates all objects (with some restrictions) for no escape allocations on the method's invocation stack frame. FIG. 5B shows the same variable declaration in FIG. 5A, but later in method A( ) there is another declaration of a variable classVar that is a reference to the object referenced by k. We assume that classVar is a class variable declaration, which means that its lifetime extends globally beyond method A( ), making this allocation a global escape case. The prior art Choi approach allocates all objects that are global escape to the heap.

FIG. 5C has the same declaration statement for k as FIG. 5A, but includes a statement that returns a reference to the allocated object referenced by k from method A( ). This return value means that the lifetime of the allocated object may potentially extend beyond method A( ), but we don't know to what extent. FIG. 5D shows a different case for arg escape. An instruction L.addToList(k) adds the reference k to a list. The allocated object referenced by k can thus potentially be accessed outside of method A( ), but is not necessarily accessed. These cases illustrate the "arg escape" case, where an argument or return value causes the lifetime of an object to potentially extend beyond the scope of the method that creates the object. The prior art Choi approach treats arg escape cases the same as global escape, forcing these allocations to the heap.

Figure 6:
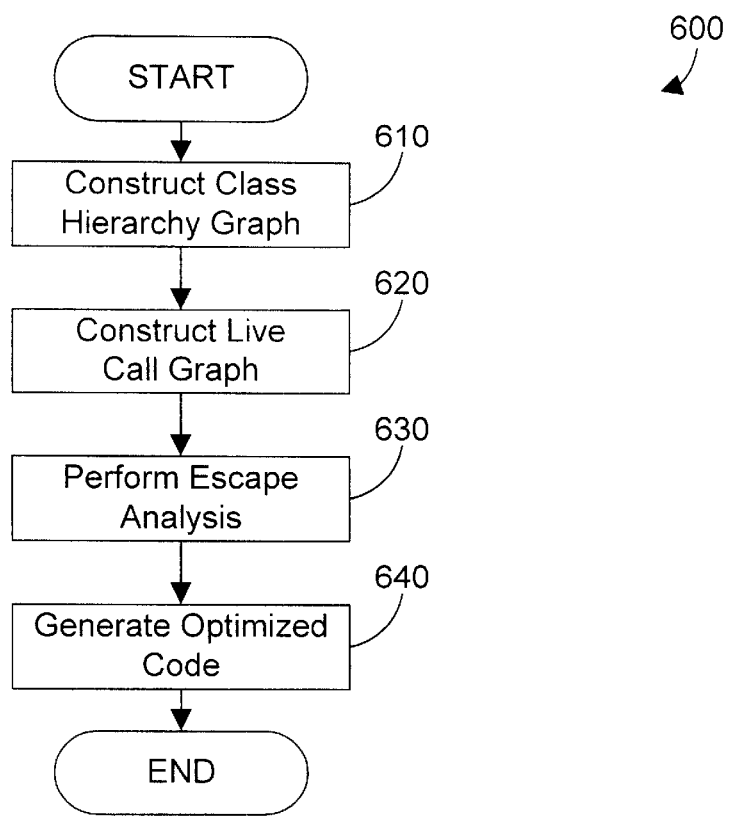
FIG. 6 is a prior art method for allocating objects in a Java program.

The prior art method disclosed in Choi et al. is represented in simplified form in the method 600 of FIG. 6. First, a class hierarchy graph is constructed (step 610). The class hierarchy graph represents inheritance relationships among all classes in a Java program. There is a node in the class hierarchy graph for each class in the program, and there is an arc in the class hierarchy graph from the node for class A to the node for class B if and only if B directly inherits from (i.e., "extends") class A.

Once a class hierarchy graph is constructed in step 610, a live call graph is constructed (step 620). The live call graph contains one node for every method in a Java program that can apparently be called during that program's execution. Methods that can be called from outside the Java program (such as "main") are designated as "root methods." There is an arc in the live call graph from method A to method B if it appears possible for method A to call method B during program execution. By definition, every method in a live call graph can be reached from at least one root node by a directed sequence of arcs; methods that cannot be executed ("dead methods") are not represented in the live call graph. A method that calls no other method is designated as a "leaf method." The class hierarchy graph is consulted at virtual method call sites to determine which methods may potentially be called, based on inheritance. Construction of class hierarchy graphs and live call graphs are well known in the art.

Once a live call graph has been built in step 620, an escape analysis can be performed (step 630). An escape analysis means that each allocation instruction (that creates an object) is labeled as one of the three options: no escape, global escape, and arg escape. Once the escape analysis in step 630 is complete, the code is then generated (step 640) using the information in the escape analysis to determine where each object is allocated. In the prior art Choi et al. approach of method 600, objects that are no escape are allocated on the invocation stack frame of the method that creates the object, while objects that are global escape and arg escape are allocated from the heap.

Figure 8:
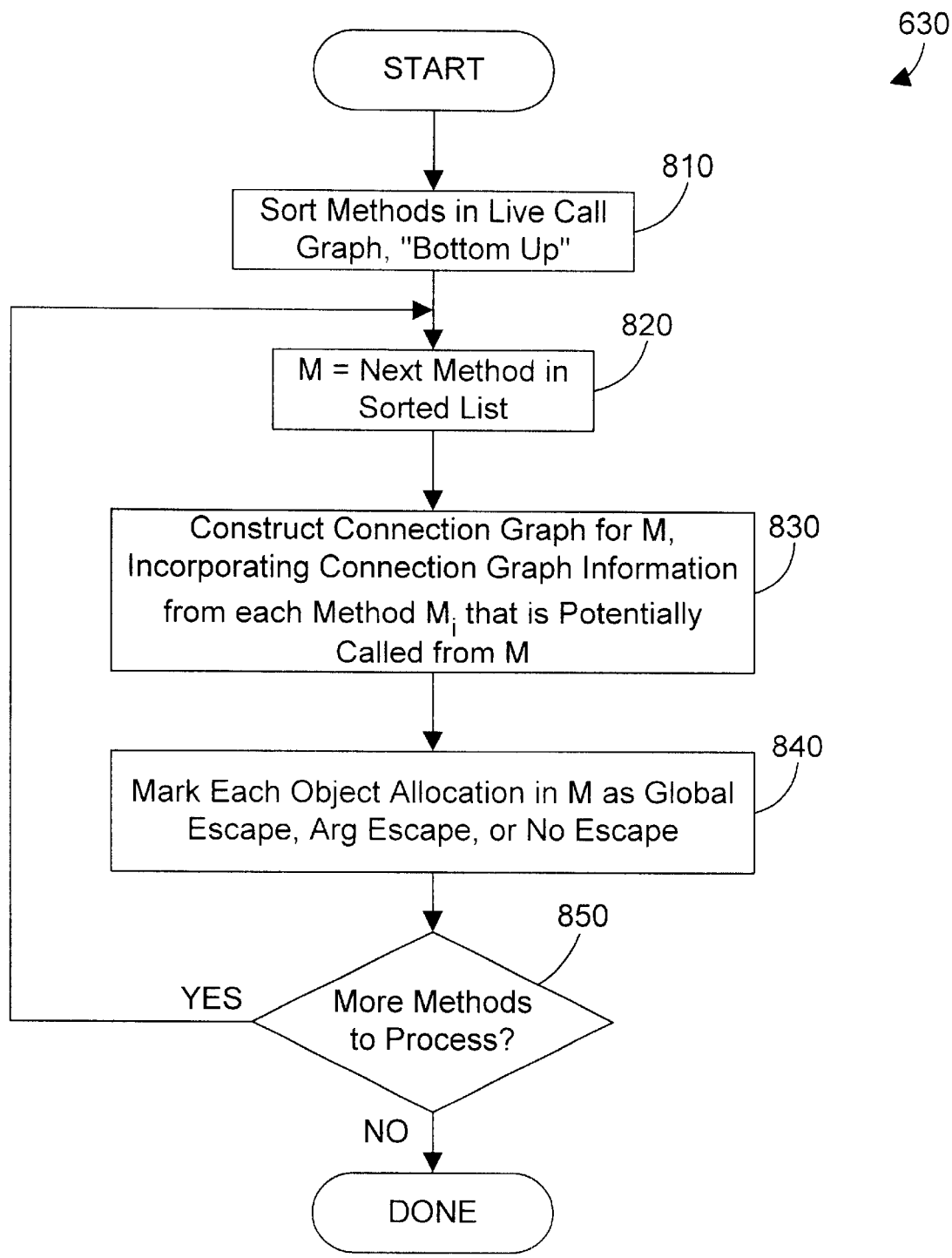
FIG. 8 is a prior art method for performing step 630 of FIG. 6.

Details of the escape analysis step 630 of FIG. 6 are shown in the flow diagram of FIG. 8. First, the methods in the live call graph are sorted from the bottom up (step 810). This means that leaf nodes in the graph are considered first, which do not call other methods. The first method on the sorted list is then assigned to M (step 820). A connection graph is then constructed for M, incorporating connection graph information for each method (denoted $M_i$) that is potentially called from M (step 830). A connection graph denotes potential relationships among variables and parameters that may reference objects, statements that allocate objects, and fields contained in objects. Next, each object allocation in M is marked as global escape, arg escape, or no escape (step 840). If more methods need to be processed (step 850=YES), step 630 loops back to step 820 and continues. Once all methods have been processed (step 850=NO), step 630 is done. Note that the description of a connection graph herein is simplified for the purpose of illustrating the preferred embodiments of the invention. For more details regarding how to construct a connection graph, see the Choi et al. article referenced above.

Figure 11:
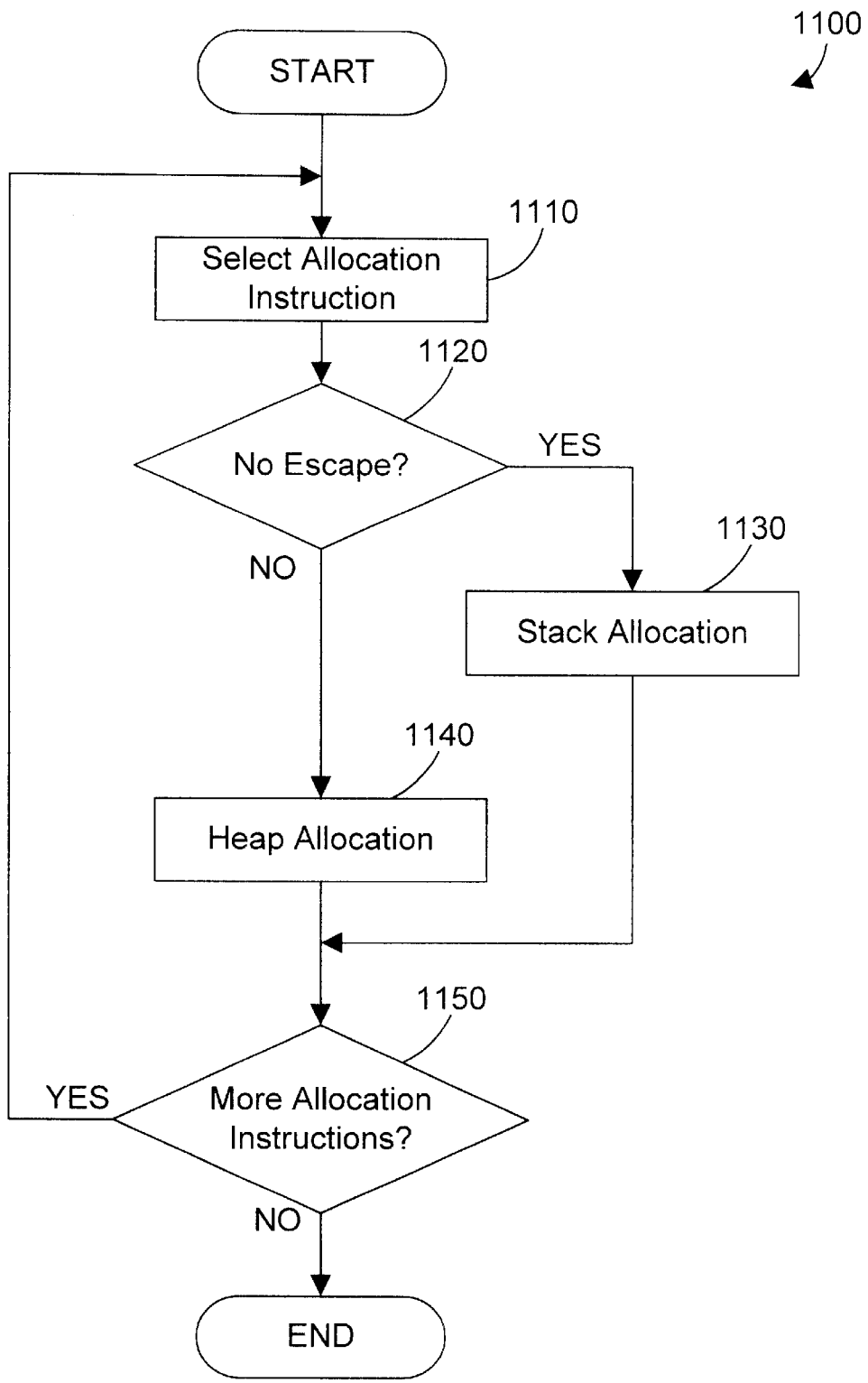
FIG. 11 is a prior art method for allocating objects in a Java program after performing the prior art escape analysis of FIG. 8.

In the prior art, once an escape analysis has been performed, such as that shown by step 630 in FIGS. 6 and 8, the code can then be optimized using this escape analysis information, as shown in step 640 of FIG. 6. Referring now to FIG. 11, a method 1100 for generating optimized code represents a simplified flow diagram of some of the functions that are typically included in the generation of the optimized code in step 640. An allocation instruction in the object oriented program is first selected (step 1110). If the allocation instruction is marked as no escape (step 1120=YES), code is generated for the allocation instruction that causes an object to be allocated on the stack (step 1130). This allocation is preferably on the invocation stack frame of the method. If the instruction is either global escape or arg escape (step 1120=NO), code is generated for the allocation instruction that causes an object to be allocated from the heap (step 1140). If more allocation instructions remain (step 1150=YES), method 1100 loops back to step 1110 and continues. Once no more allocation instructions remaining (step 1150=NO), method 1100 is done.

Method 1100 clearly shows that the prior art escape analysis treats the global escape and arg escape cases the same, forcing them to be allocated from the heap. The preferred embodiments of the present invention described below improve on the escape analysis approach of Choi et al. by performing further analysis on arg escape objects, and potentially allocating some of these arg escape objects to a method's invocation stack frame instead of forcing all arg escape objects to be allocated from the heap. The details of the preferred embodiments are described below.

2. DETAILED DESCRIPTION

An apparatus and method in accordance with the preferred embodiments provide an improvement to the Choi et al. escape analysis by determining whether an object can be allocated on a method's invocation stack frame even though it is marked arg escape. Some objects whose lifetimes extend beyond the current method could still be allocated on the stack if: 1) the method that creates the object can be inlined into one or more caller methods; and 2) the lifetime of the object does not extend beyond the applicable caller methods' lifetimes. By allocating some of the arg escape objects to a calling method's invocation stack frame instead of to the heap, the performance of the resulting computer program is significantly enhanced.

Figure 7:
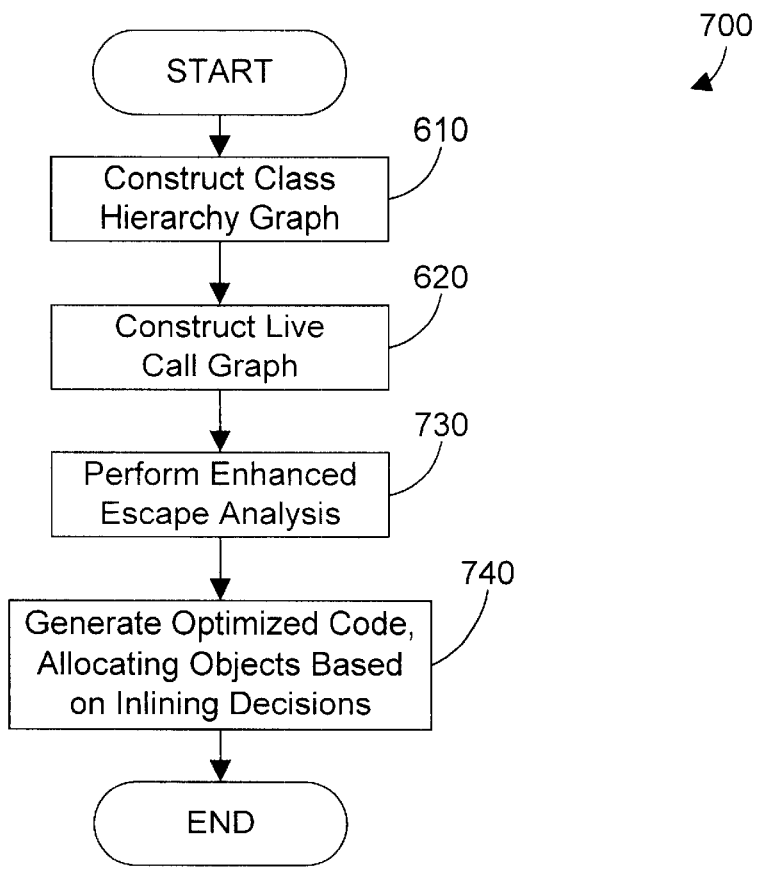
FIG. 7 is a method in accordance with the preferred embodiments for allocating objects in a Java program.

Referring to FIG. 7, a method 700 in accordance with the preferred embodiments allocates objects in a Java program in a way that allows some of the allocation instructions marked arg escape to be allocated to a method's invocation stack frame. First, a class hierarchy graph is constructed (step 610) and a live call graph is constructed (step 620), the same as for prior art method 600 in FIG. 6. At this point a type of escape analysis is performed in accordance with the preferred embodiments (step 730), but this escape analysis is enhanced when compared to prior art step 630 of FIG. 6. Specifically, comparing the flow diagrams of FIGS. 8 and 9 reveals that the enhanced escape analysis 730 includes an additional step 910 when compared with the prior art. After each object allocation in M is marked as global escape, arg escape, or no escape (step 840), inline stacks are then generated by processing the actual parameters and return values at each call site in M (step 910). These inline stacks are provided as annotations on the connection graph. Intuitively, an inline stack is a list of methods that must be inlined at particular call sites in order for a given allocation instruction to allocate objects on the stack, rather than from the heap. Returning now to FIG. 7, once the enhanced escape analysis is complete (step 730), the optimized code can be generated. One aspect of code generation is method inlining, in which the code of selected methods is copied into their callers in place of selected method call instructions. In cases where all methods and call sites mentioned in an inline stack have been selected for inlining, the corresponding allocation instruction can allocate its objects on the stack. This is because the allocation instruction has been copied into a method for which that instruction is marked no escape, rather than arg escape.

In Java, this is a particularly useful concept, because Java does not have any concept of object nesting, as found in C++. Objects never contain other objects; rather they contain references to other objects. Suppose we want to create an object of type Farm, which contains a reference to an object of type Barn, which in turn contains a reference to an object of type Cow. When the constructor for Farm is invoked, it calls the constructor for Barn to produce that sub-object, which will then call the constructor for Cow to produce that sub-sub-object. In the prior art, the Barn constructor cannot allocate the Cow on its stack frame, because the "this" pointer returned by the Barn constructor can reference the Cow after the Barn constructor is terminated. Neither can the constructor for the Farm allocate the Barn in its stack frame, for similar reasons.

However, if the constructor for Cow is inlined into the Barn constructor, which is then inlined into the Farm constructor, which is then inlined into a method X that wants to create a new farm, the limitations on nesting have been effectively overcome. If the Farm has a lifetime that is bounded by the scope of X, we can allocate not only the Farm object, but also the Barn object and the Cow object, on X's stack frame. Even though the Cow and Barn initially appear to escape the scope of their creating methods, after inlining this is not true. In this manner inlining can be used to stack allocate some arg escape instructions that satisfy predetermined criteria.

Figure 9:
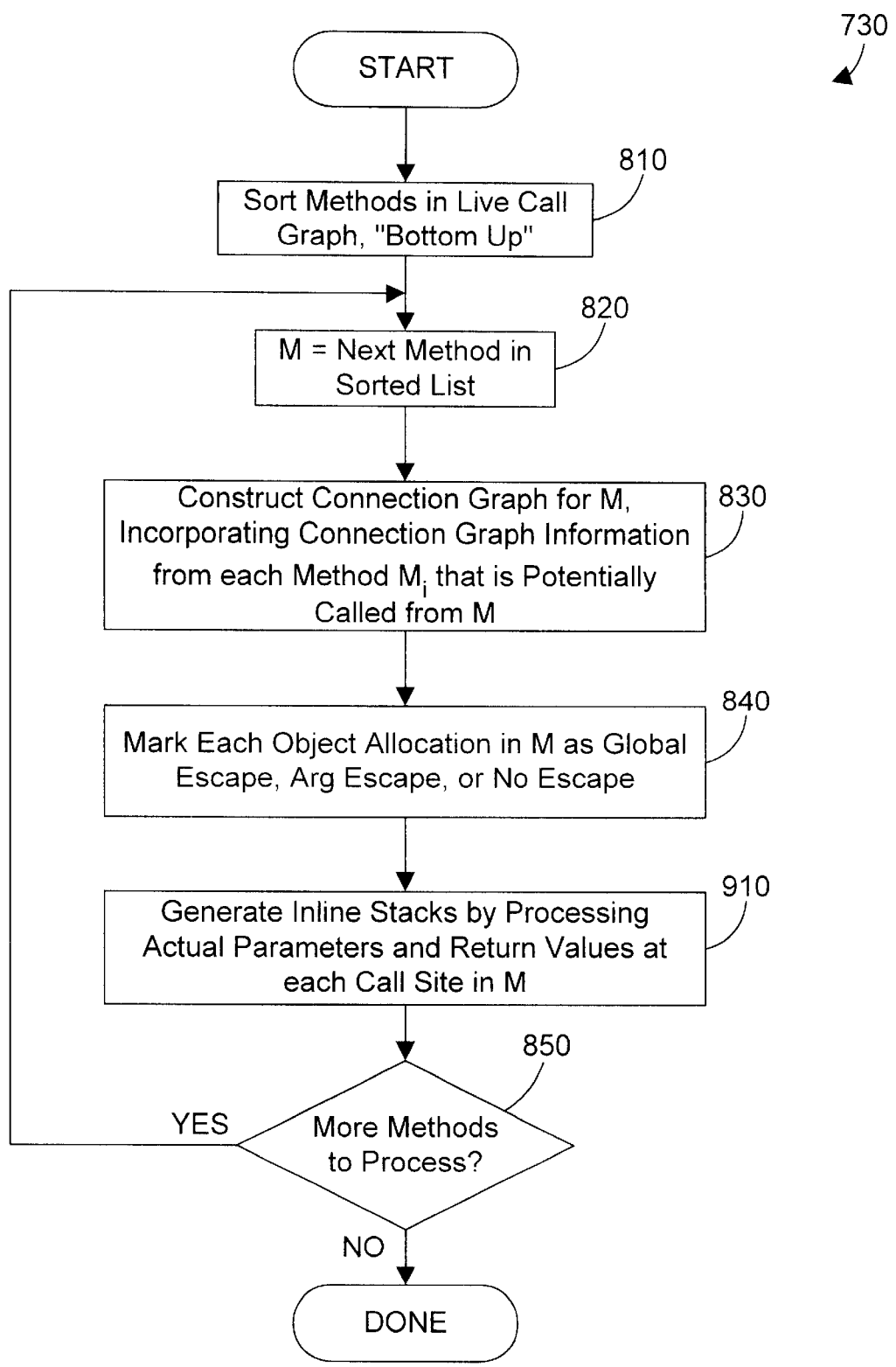
FIG. 9 is a method in accordance with the preferred embodiments for performing step 730 of FIG. 7.
Figure 10:
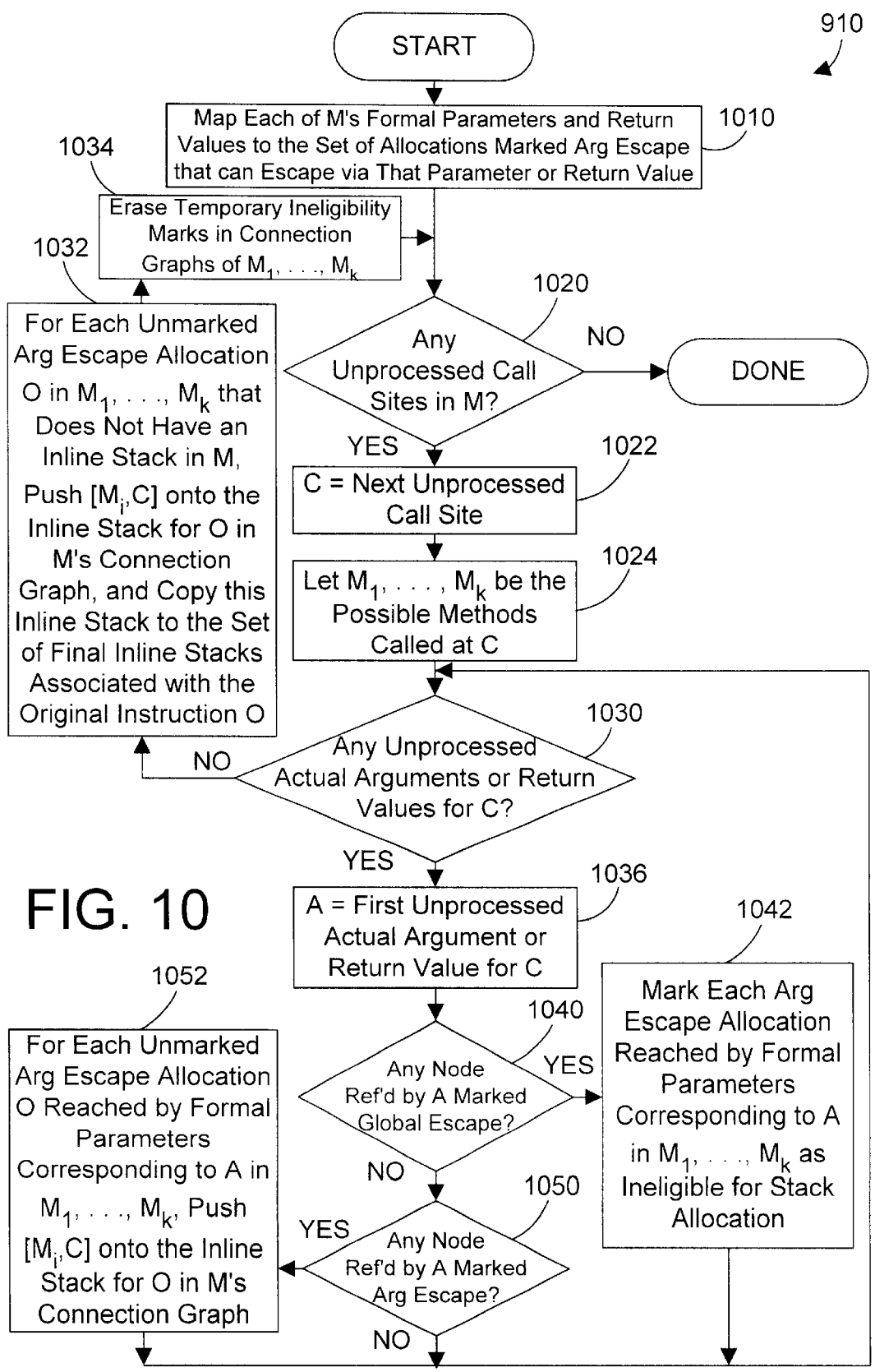
FIG. 10 is a method in accordance with the preferred embodiments for performing step 910 of FIG. 9.

FIG. 10 illustrates a flow diagram of one possible implementation of step 910 of FIG. 9 in accordance with the preferred embodiments. First, each of the selected method M's formal parameters and return values are mapped to a set of allocation instructions marked arg escape that can escape via that formal parameter or return value (step 1010). A method's formal parameters are the method's name for values that are passed to the method, while a return value is a method's name for the value that is returned from the method. At this point, step 910 determines whether there are any unprocessed call sites in M (step 1020). If not (step 1020=NO), step 910 is done. If so (step 1020=YES), the next unprocessed call site is selected, and assigned the letter "C" for convenience in referring to the call site in the remainder of the flow diagram (step 1022). Next, a set of methods $M_1, \ldots, M_k$ are defined that are the possible methods called at C (step 1024). Next, step 910 determines whether there are any unprocessed actual arguments or return values for C (step 1030). If so (step 1030=YES), a variable A is assigned as the first unprocessed actual argument or return value for C (step 1036) for convenience in discussing the remaining steps in the flow diagram of FIG. 10. If A references any object allocation node that is marked global escape (step 1040=YES), control proceeds to step 1042. Intuitively, anything directly or indirectly referenced by an argument or return value marked global escape will also be marked global escape if inlined at this call site. Step 1042 examines each connection graph for the potentially called methods $M_1, \ldots, M_k$, considering the formal parameters in each $M_i$ that correspond to A at the call site C. Using the mapping created in step 1010 when $M_i$ was processed, a list of arg escape allocation instructions reachable from A is constructed. Each of these instructions is marked as ineligible for stack allocation at call site C. Control then returns to step 1030 to determine if any unprocessed actual arguments or return values remain.

If A does not reference any object allocation node marked global escape (step 1040=NO), then step 910 checks whether A references any object allocation node marked arg escape (step 1050). If so (step 1050=YES), control proceeds to step 1052. Intuitively, if an actual argument or return value in the current method is marked arg escape, then any arg escape object in a called method that is reachable from the corresponding formal parameter should also be marked arg escape in the current method M, if the called method is inlined at this call site. Step 1052 examines the connection graphs for potentially called methods in a similar manner to step 1042, constructing a list of arg escape allocation instructions reachable from A. For each allocation instruction O in this list, where O occurs in method $M_i$, the ordered pair $[M_i,C]$ is pushed onto the inline stack for O in the current method M. Specifically, if O does not have an inline stack in method $M_i$, then the inline stack for O in the current method becomes $\{[M_i,C]\}$. Otherwise, the inline stack is formed by prepending $[M_i,C]$ to the list of ordered pairs in the inline stack for O in $M_i$. Control then returns to step 1030 to determine if any unprocessed actual arguments or return values remain.

If A does not reference any object allocation node marked arg escape (step 1050=NO), then no action is taken immediately. Intuitively, the fact that an arg escape allocation instruction O in any method called at C is reachable from A will not restrict whether or not that instruction may employ stack allocation. If all actual arguments at C that can reach O are marked no escape, then O can use stack allocation if inlined into the current method M; but if any actual argument at C that can reach O is marked arg escape or global escape, O must use heap allocation in M. So when step 1050=NO, no action is taken until all actual arguments and return values have been processed. Control then returns to step 1030.

When all actual arguments and return values at C have been processed (step 1030=NO), step 1032 checks for allocation instructions O in $M_1, \ldots, M_k$ that are reachable only from actual arguments and return values marked no escape. This is done by checking each candidate O to see if it has been marked ineligible for stack allocation (global escape) or has been assigned an inline stack in the current method M (arg escape). If not, then intuitively we can see that O can employ stack allocation if it is inlined into the current method M. As in step 1052, step 1032 forms the inline stack for O in the current method M by prepending [$M_i$,C] to the inline stack for O in $M_j$, if any. Unlike step 1052, step 1032 further copies the inline stack for O in M to a list of final inline stacks associated with the original instruction O. Note that this list is only associated with the original copy of O, which may be several levels down in the call graph. Intuitively, the list of final inline stacks associated with O represents the set of all possible inlining decisions for which O can be stack-allocated in some ancestor method in the call graph.

After recording inline stacks in step 1032, step 910 erases any temporary marks that it associated with the connection graphs of methods $M_j, \ldots, M_k$ in step 1042 (step 1034). Control then returns to step 1020 to determine if there are any other call sites in M left to process.

Once inline stacks have been associated with each allocation instruction according to step 910 for every method in the live call graph, enhanced code generation using the inline stacks may occur in step 740 of FIG. 7. One suitable implementation for a portion of step 740 is shown as method 1200 of FIG. 12. First, inlining is performed on the compiler's internal representation of all methods in the Java program. This can be done using any heuristic method of selecting inline candidates, many of which are well known in the art. In accordance with the preferred embodiments, such heuristics may be suitably modified to examine the inline stacks constructed during the enhanced escape analysis of FIG. 9. During inlining, object allocation statements may be copied into calling methods, perhaps to several levels. Each time an allocation statement is copied into a caller when inlining at a call site C, the copy of the statement is assigned an inline history in that caller by prepending the ordered pair [$M_i$,C] to its inline history in the called method $M_i$, if any. Note that the representation of the inline history corresponds directly with the inline stacks constructed during enhanced escape analysis. Each copied allocation statement also maintains a pointer to the inline stacks created for the original allocation statement.

After inlining is complete and inline histories have been generated, an allocation instruction is selected (step 1110). If the allocation instruction is marked no escape (step 1120= YES), the object can be allocated on the stack (step 1130), the same as in prior art method 1100 of FIG. 11. If the selected allocation instruction is not marked no escape (step 1120=NO), but if it is marked global escape (step 1222= YES), the object is allocated from the heap (step 1140). However, if the selected allocation instruction is marked arg escape (step 1120=NO and step 1222=NO), method 1200 determines if the inline history of the allocation instruction is an exact match for one of the inline stacks (if any) associated with the original allocation instruction (step 1210). If so (step 1210=YES), the object is allocated on the stack (step 1130). Otherwise (step 1210=NO), the object is allocated from the heap (step 1140). Regardless of the results of steps 1120, 1222, and 1210, control then proceeds to step 1250. If there are more allocation instructions to process (step 1250=YES), method 1200 loops back to step 1110 and continues. Once all allocation instructions have been processed (step 1250=NO), method 1200 ends.

Figure 12:
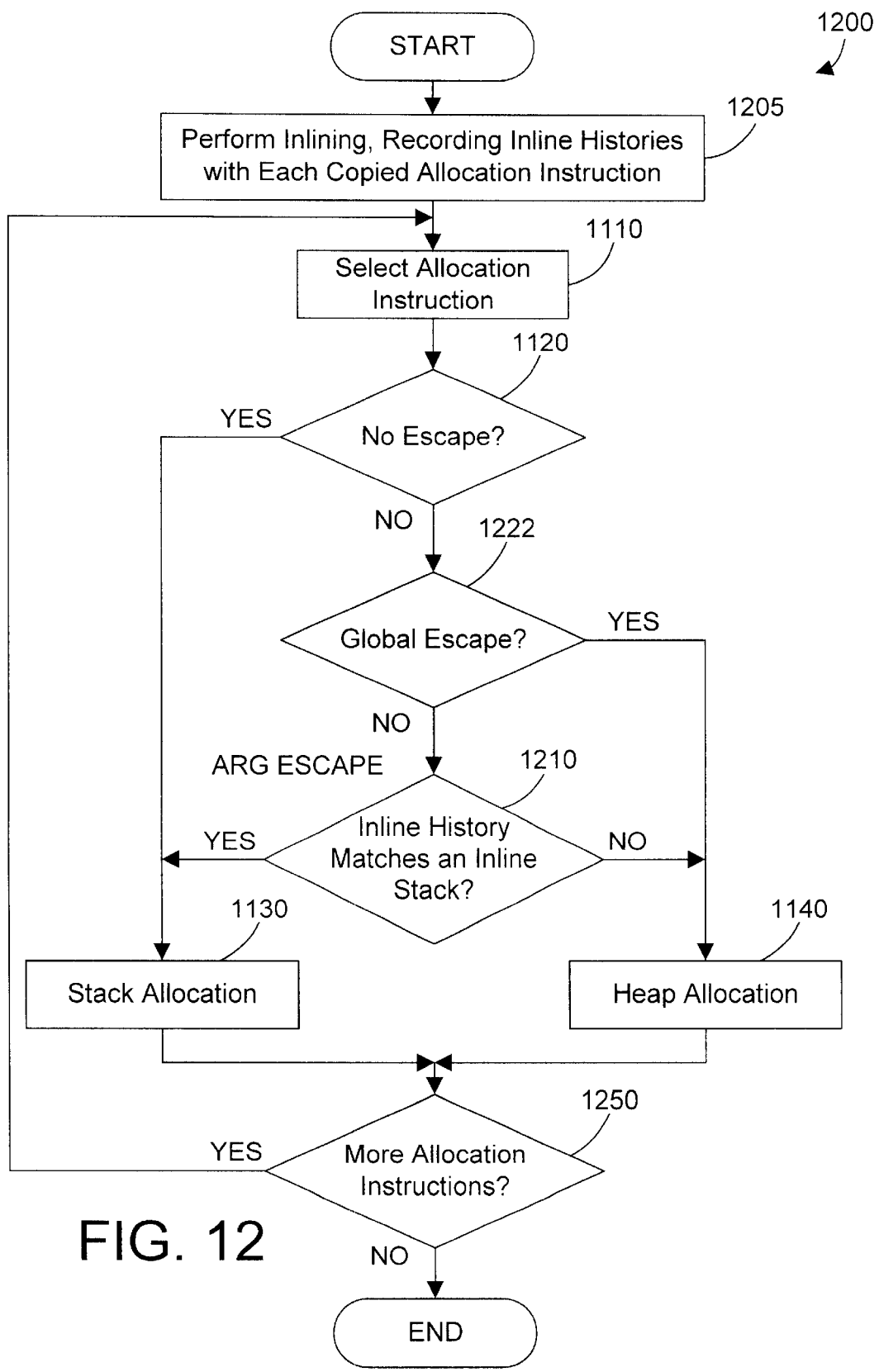
FIG. 12 is a method in accordance with the preferred embodiments for allocating objects in a Java program after performing the enhanced escape analysis of FIG. 9.

The difference between prior art method 1100 of FIG. 11 and method 1200 in accordance with the preferred embodiments in FIG. 12 illustrates significant advantages of the preferred embodiments when compared to the prior art. In method 1100, all instructions marked arg escape are allocated from the heap. In method 1200, in contrast, some allocation instructions that are marked arg escape may be allocated on a method's invocation stack frame if certain conditions are met.

The detailed methods in FIGS. 10 and 12 are best understood with reference to a simple example in FIGS. 13–16 that is presented to illustrate the methods of the preferred embodiments. FIG. 13 illustrates a live call graph showing the flow between five simple methods in an object oriented program. FIG. 14 lists assumptions regarding the sample object oriented program depicted in FIG. 13. FIG. 15 shows Java pseudo-code of one implementation that satisfies the live call graph of FIG. 13 and the assumptions in FIG. 14. Statements in the methods of FIG. 15 are annotated (e.g., A1) to aid in the ensuing discussion. The live call graph of FIG. 13 is one example of a live call graph that could be generated by performing steps 610 and 620 of FIG. 7. Continuing the flow in FIG. 7, step 730 is next, which performs the enhanced escape analysis as shown in FIG. 9.

Referring now to FIG. 9, the methods in the live call graph are first sorted, "bottom up" (step 810). C is the only method that calls no other node, so C becomes the first method. Any of methods E, B or D could come next, and we assume that these are arbitrarily ordered D, E, B. Node A is last because it calls method B. The final ordering from performing step 810 for this specific example is: C, D, E, B, and A.

We then assign M to the first method in the sorted list, method C (step 820). We then construct a connection graph for M, incorporating connection graph information from each method that is potentially called from M (step 830). The connection graph for the program of FIGS. 13–15 are shown in FIGS. 16A–16E.

In this simplified discussion, connection graphs contain two kinds of nodes. Reference nodes (shown as ovals) represent variables or fields that contain references to object allocation nodes. Object allocation nodes (shown as squares) represent allocation instructions that cause objects to be allocated. Connection graphs link nodes using three kinds of arcs. Points-to arcs (labeled with a P) originate at a reference node R and terminate at an object allocation node O, and represent that variable or field R may at some time contain a reference to an object allocated by instruction O. Field arcs (labeled with an F) originate at an object allocation node O and terminate at a reference node R, and represent that objects allocated by instruction O contain a field R that references other objects. Deferred arcs (labeled with a D and shown as dashed arcs) originate at a reference node R and terminate at another reference node S, and represent that field or variable R may point to the same set of objects that field or variable S does. The foregoing discussion of connection graphs is somewhat simplified; the reader is referred to Choi et al. for full details.

Figure 16A:
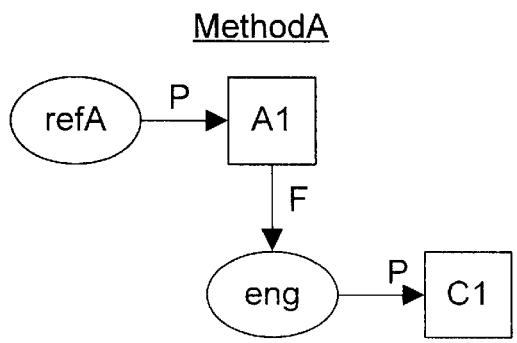
FIGS. 16A–16E are each a connection graph for methods in the program of FIGS. 13–15.
Figure 16B:
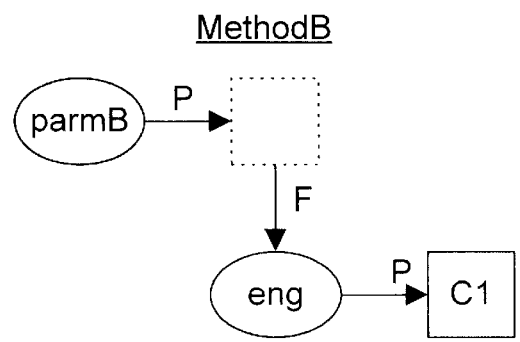
Figure 16C:
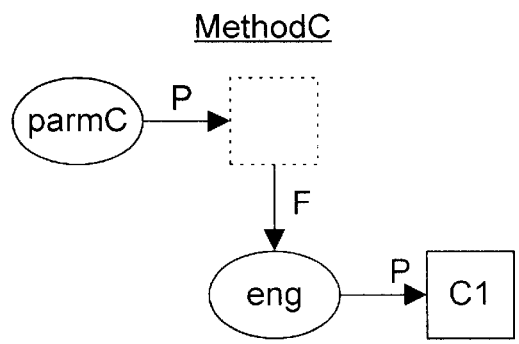

The connection graph for methodC shown in FIG. 16C contains two reference nodes labeled parmC and eng. Note that since parmC is a formal parameter, we do not know what it might reference when methodC is called. This is represented by a points-to arc from parmC to a "phantom" object allocation node (shown as an unlabeled dashed square). The phantom object is of type Vehicle, which contains a single reference field eng, so there is a field arc from the phantom node to a reference node labeled eng. Statement C1 of methodC indicates that parmC.eng should receive a reference to a newly allocated object; this generates a points-to arc from the reference field labeled eng to a new object allocation node labeled C1 (after the statement it represents).

After constructing the connection graph for methodC (step 830), each node in the connection graph (e.g., FIG. 16C) is marked global escape, arg escape, or no escape (step 840). All nodes are marked no escape by default. Then all global reference nodes are marked as global escape, and every node that can be reached from such a node by a directed path in the connection graph is also marked as global escape. (Reference nodes reached by deferred arcs are "bypassed" in this.) Since there are no global reference nodes in methodC, all nodes remain marked no escape at this point. Next, each node representing a formal parameter or return value is marked as arg escape, and every node that can be reached from such a node by a directed path in the connection graph is also marked arg escape. (Again, reference nodes reached by deferred arcs are bypassed.) Thus, parmC is marked as arg escape, which causes all other nodes in the same connection graph to be marked as arg escape. In particular, the object allocation node marked C1 is marked arg escape, indicating that objects allocated at instruction C1 can be referenced through parameter parmC. Processing then proceeds to step 910, one implementation of which is illustrated in FIG. 10.

Figure 16D:
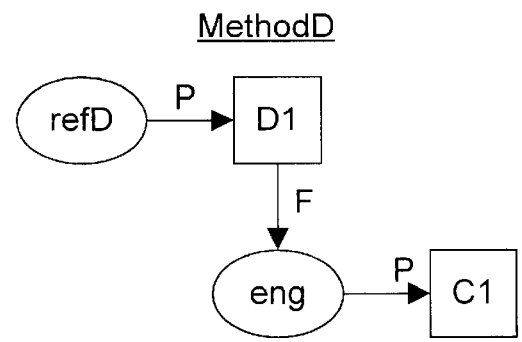

In step 1010, parmC is mapped to C1 as the only allocation instruction that can escape through parmC. Since there are no call sites in methodC (step 1020=NO), step 910 is finished. As there are still four methods left to process (step 850=YES), M is associated with methodD (step 820). The connection graph for methodD is then constructed (step 830) as shown in FIG. 16D for this specific example. The connection graph for methodD contains two reference nodes labeled refD and eng. Statement D1 of methodD indicates that refD should receive a reference to a newly allocated object; this generates a points-to arc from the reference node labeled refD to a new object allocation node labeled D1. Statement D2 of methodD calls methodC, passing refD as the only parameter. This causes a copy of the connection graph of methodC to be absorbed into the connection graph of methodD. In particular, refD is bound to parmC at this call site, so the phantom node in methodC's connection graph is replaced by the set of things that refD can reference, in this case object allocation node D1. The result is that variable refD points to an object allocated at D1, whose eng field points to an object allocated at C1.

The nodes in the connection graph for methodD are then annotated (step 840). Again, there are no global references, and this time there are also no formal parameters or return values. Thus, all nodes in methodD are marked no escape. In particular, the object allocation node C1 is marked no escape. Processing then proceeds to step 910, one implementation of which is illustrated in FIG. 10.

Since methodD has no formal parameters or return values, step 1010 does nothing. There is an unprocessed call site D2 in methodD (step 1020=YES), so C is assigned to call site D2 (step 1022). In this case only one method can be called at D2, namely methodC, so M$_I$ is assigned to methodC (step 1024). There are unprocessed actual arguments for C (step 1030=YES), so A is assigned to the first actual argument, namely refD (step 1036). Note that all methods in this example are static methods, so there is no implicit "this" argument passed as with Java virtual methods. Implicit "this" arguments are treated the same as any other argument in this embodiment. Since refD only references D1, which is not marked global escape (step 1040=NO), nor arg escape (step 1050=NO), and there are no unprocessed actual arguments or return values for C (step 1030=NO), control passes to step 1032. C1 is the only arg escape allocation in the connection graph for M$_I$=methodC shown in FIG. 16C.

Since neither step 1042 ever marked C1 as ineligible, nor step 1052 ever built an inline stack for C1, step 1032 must create an inline stack for C1 in methodD. Since C1 does not have an inline stack in methodC, a fresh inline stack is created, consisting of the single pair {[methodC,D2]}, and this inline stack is added to the set of final inline stacks for the original C1 in methodC. This is reflected in the table shown in FIG. 17. Since step 1042 was not executed for call site D2, step 1034 has no effect. There are no more call sites in methodD (step 1020=NO), so step 910 is complete.

Figure 16E:
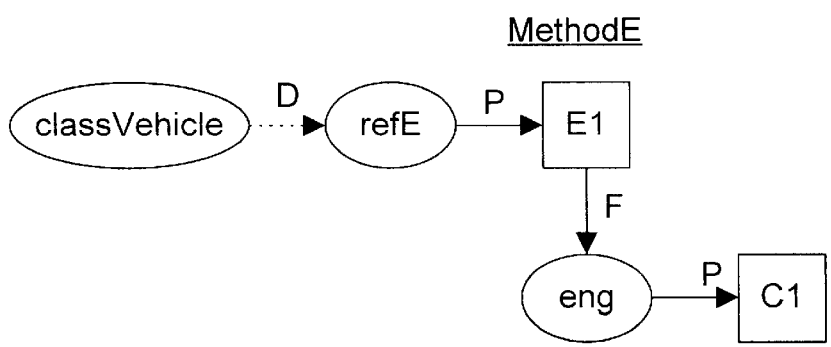

As there are still three methods left to process (step 850=YES), M is associated with methodE (step 820). The connection graph for methodE is then constructed (step 830), as shown in FIG. 16E for this specific example. The connection graph for methodE is similar to that for methodD. After processing statements E1 and E2, variable refE points to an object allocated at E1, whose eng field points to an object allocated at C1. Next, statement E3 causes an assignment of the reference value contained in refE to the reference variable classVehicle. This is shown in the connection graph by adding a deferred arc from reference node class Vehicle to reference node refE, showing that classVehicle and refE point to the same set of possible objects.

The nodes in the connection graph for methodE are then annotated (step 840). Since the class variable classVehicle is a global reference node, it is marked global escape. The only object node it points to (bypassing reference node refE) is E1, which is also marked global escape. E1's field eng and the object C1 that it references are likewise marked global escape. This represents the fact that, after methodE terminates, other methods may be able to access objects allocated at C1 and E1 through variable classVehicle. Processing then proceeds to step 910, one implementation of which is illustrated in FIG. 10.

As methodE has no formal parameters or return values, step 1010 has no effect. There is an unprocessed call site E2 in methodE (step 1020=YES), so C is assigned to call site E2 (step 1022). Again, only one method can be called at E2, namely methodC, so M$_I$ is assigned to methodC (step 1024). There are unprocessed actual arguments for C (step 1030=YES), so A is assigned to the first actual argument, namely refE (step 1036). Since refE references only E1, which is marked global escape (step 1040=YES), all arg escape object allocation nodes in methodC's connection graph that are reachable from parmC must be marked ineligible for stack allocation (step 1042). In this case the node C1 in methodC's connection graph is marked ineligible. Since there are no unprocessed actual arguments or return values for call site E2 (step 1030=NO), step 1032 considers whether any arg escape allocation in M$_I$=methodC is unmarked and has no inline stack. Since C1 was marked ineligible, and there are no other object allocation nodes in methodC's connection graph, step 1032 has no effect. The ineligibility marking in methodC's connection graph is then erased (step 1034). Since there are no unprocessed call sites in methodE (step 1020=NO), step 910 is finished.

As there are still two methods left to process (step 850=YES), M is associated with methodB (step 820). The connection graph for methodB is then constructed (step 830), as shown in FIG. 16B for this specific example. The connection graph for methodB is also similar to that for methodD, except that in this case parmB is bound to parmC at the call to methodC. Since parmB is a formal parameter, it also points to unknown objects, so it is again represented as referencing a phantom object allocation node.

The nodes in the connection graph for methodB are then annotated (step 840). There are no global reference nodes, so no nodes are marked global escape. Because parmB is a formal parameter that reaches all nodes in the graph, all nodes in the connection graph for methodB are marked arg escape. Processing then proceeds to step 910, one implementation of which is illustrated in FIG. 10.

In step 1010, parmB is mapped to C1 as the only allocation instruction that can escape through parmB. There are unprocessed call sites in methodB (step 1020=YES), so C is assigned to call site B1 (step 1022). Again, only one method can be called at B1, namely methodC, so $M_I$ is assigned to methodC (step 1024). There are unprocessed actual arguments for C (step 1030=YES), so A is assigned to the first actual argument, namely parmB (step 1036). Since A references only a phantom node, which is not marked global escape (step 1040=NO), but is marked arg escape (step 1050=YES), all arg escape object allocation nodes in methodC's connection graph that are reachable from parmC must have an inline stack generated for them in methodB's connection graph (step 1052). In this case the inline stack {[methodC,B1]} is associated with node C1 in methodB's connection graph. This is reflected in the table shown in FIG. 17. Since there are no unprocessed actual arguments or return values for C (step 1030=NO), all arg escape allocations in methodC (namely C1) have inline stacks (step 1032), no ineligible marks need to be erased (step 1034), and there are no unprocessed call sites in method B (step 1020=NO), step 910 is finished.

As there is still one method left to process (step 850=YES), M is associated with methodA (step 820). The connection graph for methodA is then constructed (step 830), as shown in FIG. 16A for this specific example. The result is that variable refA points to an object allocated at A1, whose eng field points to an object allocated at C1. The nodes in the connection graph for methodA are then annotated (step 840). There are no global reference nodes, so no nodes are marked global escape. There are no formal parameters or return values, so no nodes are marked arg escape. Thus all nodes in methodA's connection graph are marked no escape. Processing then proceeds to step 910, one implementation of which is illustrated in FIG. 10.

Since methodA has no formal parameters or return values, step 1010 has no effect. There is an unprocessed call site in methodA (step 1020=YES), so C is assigned to call site A2 (step 1022). Again, only one method can be called at A2, namely methodB, so $M_I$ is assigned to methodB (step 1024). There are unprocessed actual arguments for C (step 1030=YES), so A is assigned to the first actual argument, namely refA. Since refA only references A1, which is not marked global escape (step 1040=NO), nor arg escape (step 1050=NO), and there are no unprocessed actual arguments or return values for C (step 1030=NO), control passes to step 1032. Since C1 has an inline stack in methodB's connection graph, namely {[methodC,B1]}, the inline stack created for C1 in methodA is {[methodB,A2],[methodC,B1]}. This is added to the list of final inline stacks for the original C1 in methodC. Intuitively, this indicates that C1 can allocate objects from methodA's stack frame provided methodC is inlined at call site B1 and method B is inlined at call site A2. Step 1034 has no effect, and since there are no unprocessed call sites in methodA (step 1020=NO), step 910 is complete. As there are no more methods to process (step 850=NO), the enhanced escape analysis of step 730 is complete.

FIG. 17 contains a table depicting the results of inline stack calculations for the above example. There is one row in the table for each object allocation node appearing in one of the connection graphs in FIGS. 16A–16E. The first two columns identify the node by the method associated with the connection graph and the original statement label of the allocation instruction. The third column shows the inline stack created for the object allocation node in steps 1032 and/or 1042 of method 910 in FIG. 10. The fourth column shows the set of final inline stacks created for object allocation nodes in their original methods. Note that "N/A" (not applicable) is shown in the fourth column of the table in FIG. 17 for copies of object allocation nodes in other methods, into which the original allocation instruction might potentially be inlined, since such copies can never have final inline stacks associated with them. Note also that only the final inline stacks will be used later to determine which objects may be allocated on the stack; the other inline stacks are temporary values used to calculate the final inline stacks.

Next, code generation is performed (step 740). Referring to FIG. 12, inlining is performed in step 1205. For purposes of this example, we will assume that all call sites in the methods shown in FIG. 15 are selected for inlining. Thus methodB, methodD, and methodE all have copies of methodC's instructions duplicated in their method bodies, while methodA has a copy of methodB's and methodC's instructions duplicated in its method body. In particular, a copy of statement C1 now exists in each of the five methods. Each copy of an allocation statement has its original marking (no escape, arg escape, global escape) associated with it, so all copies of statement C1 are marked as arg escape. The other allocation statements (A1, D1, and E1) all exist only in their original methods.

In the process of inlining (step 1205), each copy of C1 is given an inline history. Specifically, the inline history for C1 in methodC is empty; the inline history for C1 in methodD is {[methodC,D2]}; the inline history for C1 in methodE is {[methodC,E2]}; the inline history for C1 in methodB is {[methodC,B1]}; and the inline history for C1 in methodA is {[methodB,A2],[methodC,B1]}.

Next, an allocation instruction is selected for processing (step 1110). Methods may be processed in arbitrary order; we will assume for this example that they are processed alphabetically, so that allocation instruction A1 in methodA is selected first. Since A1 was marked no escape in A's connection graph (step 1120=YES), it is selected for stack allocation (step 1130). There are more allocation instructions (step 1250=YES), so the copy of C1 in methodA is selected (step 1110). Since C1 was not marked no escape in methodC's connection graph (step 1120=NO), nor was it marked global escape (step 1222=NO), its inline history {[methodB,A2],[methodC,B1]} is compared with the final inline stacks for the original copy of C1. Since there is an exact match with one of those inline stacks (step 1210=YES), C1 is selected for stack allocation in methodA (step 1130). There are more allocation instructions (step 1250=YES), so the copy of C1 in methodB is selected (step 1110). Since C1 was not marked no escape in methodC's connection graph (step 1120=NO), nor was it marked global escape (step 1222=NO), its inline history {[methodC,B1]} is compared with the final inline stacks for the original copy of C1. Since there is no exact match with either inline stack (step 1210=NO), C1 is selected for heap allocation in methodB (step 1140). Note that this meets our expectations, since a reference to the copy of C1 in methodB escapes through parmB. There are more allocation instructions (step 1250=YES), so the copy of C1 in methodC is selected (step 1110). Since C1 was not marked no escape in methodC's connection graph (step 1120=NO), nor was it marked global escape (step 1222=NO), its inline history (which is null) is compared with the final inline stacks for the original copy of C1. Since there is no exact match (step 1210=NO), C1 is selected for heap allocation in methodC (step 1140). There are more allocation instructions (step 1250=YES), so the allocation instruction D1 in methodD is selected (step 1110). Since D was marked no escape in methodD's connection graph (step 1120=YES), D1 is selected for stack allocation in methodD (step 1130). There are more allocation instructions (step 1250=YES), so the copy of C1 in methodD is selected (step 1110). Since C1 was not marked no escape in methodC's connection graph (step 1120=NO), nor was it marked global escape (step 1222=NO), its inline history {[methodC,D2]} is compared with the final inline stacks for the original copy of C1. Since there is an exact match with one of those inline stacks (step 1210=YES), C1 is selected for stack allocation in methodD (step 1130). There are more allocation instructions (step 1250=YES), so the allocation instruction E1 in methodE is selected (step 1110). Since E1 was not marked no escape (step 1120=NO), but is was marked global escape (step 1222=YES), E1 is selected for heap allocation in methodE (step 1140). There are more allocation instructions (step 1250=YES), so the copy of C1 in methodE is selected (step 1110). Since C1 was not marked no escape in methodC's connection graph (step 1120=NO), nor was it marked global escape (step 1222=NO), its inline history {[methodC,E2]} is compared with the final inline stacks for the original copy of C1. Since there is no exact match with either inline stack (step 1210=NO), C1 is selected for heap allocation in methodE (step 1140). There are no more allocation instructions (step 1250=NO), so step 1200 terminates, ending the allocation decision process.

The step of stack allocating an object in step 1130 causes the object to be created on the invocation stack frame of a method. Note that the method may be a method that creates the object itself, or a method that calls other methods in nested levels that eventually creates the method. It is in this sense that the object is created on the invocation stack frame of a method that directly or indirectly allocates an object. A method directly allocates an object if it contains an instruction that allocates an object. A method indirectly allocates an object if it calls a method that, in turn, calls another method, for any number of levels deep, which eventually calls a method that contains the instruction that allocates an object. The present invention expressly extends to the allocation of an object on an invocation stack frame for any method that either directly or indirectly allocates an object.

Figure 18:
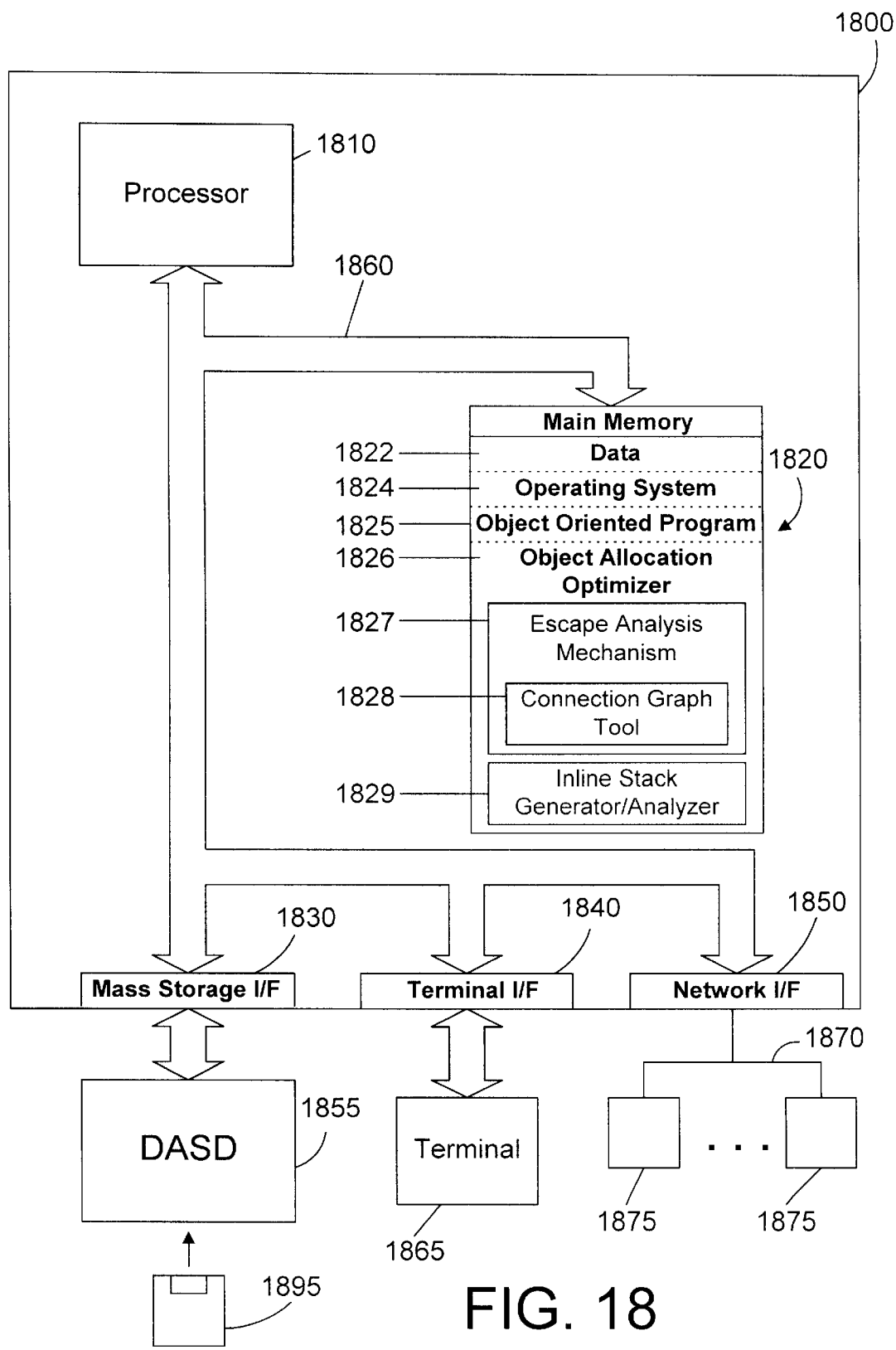
FIG. 18 is a block diagram of an apparatus in accordance with the preferred embodiments.

While the invention thus far has been described as computer-implemented methods, the invention could also be practiced as an apparatus that performs the method steps previously discussed. Referring to FIG. 18, a computer system 1800 in accordance with the preferred embodiment is an IBM AS/400 computer system. However, those skilled in the art will appreciate that the mechanisms and apparatus of the present invention apply equally to any computer system, regardless of whether the computer system is a complicated multi-user computing apparatus. a single user workstation, or an embedded control system. As shown in FIG. 18, computer system 1800 comprises a processor 1810, a main memory 1820, a mass storage interface 1830, a terminal interface 1840, and a network interface 1850. These system components are interconnected through the use of a system bus 1860. Mass storage interface 1830 is used to connect mass storage devices (such as a direct access storage device 1855) to computer system 1800. One specific type of direct access storage device 1855 is a floppy disk drive, which may store data to and read data from a floppy disk 1895.

Main memory 1820 in accordance with the preferred embodiments contains data 1822, an operating system 1824, an object oriented program 1825, and an object allocation optimizer 1826. In the preferred embodiments, object allocation optimizer 1826 suitably includes an escape analysis mechanism 1827 and an inline stack generator/analyzer 1829. The escape analysis mechanism 1827 preferably includes a connection graph tool 1828, and suitably performs step 730 described above, which performs an enhanced escape analysis. Connection graph tool 1828 suitably constructs the connection graphs referred to in FIGS. 9 and 10. Inline stack generator/analyzer 1829 suitably constructs the inline stacks that are annotations to the connection graphs, as discussed in reference to step 910 illustrated in FIG. 10. Note that object allocation optimizer 1826 in FIG. 18 is shown to contain each of the escape analysis mechanism 1827, the connection graph tool 1828, and the inline stack generator/analyzer 1829. However, each of these items could also be provided separate from object allocation optimizer 1826 within the scope of the preferred embodiments.

Computer system 1800 utilizes well known virtual addressing mechanisms that allow the programs of computer system 1800 to behave as if they only have access to a large, single storage entity instead of access to multiple, smaller storage entities such as main memory 1820 and DASD device 1855. Therefore, while data 1822, operating system 1824, OO program 1825, and object allocation optimizer 1826 are shown to reside in main memory 1820, those skilled in the art will recognize that these items are not necessarily all completely contained in main memory 1820 at the same time. It should also be noted that the term "memory" is used herein to generically refer to the entire virtual memory of computer system 1800.

Data 1822 represents any data that serves as input to or output from any program in computer system 1800. Operating system 1824 is a multitasking operating system known in the industry as OS/400; however, those skilled in the art will appreciate that the spirit and scope of the present invention is not limited to any one operating system. Object oriented program 1825 is object oriented or object based, and contains one or more statements that instantiate (or create) object oriented objects.

Processor 1810 may be constructed from one or more microprocessors and/or integrated circuits. Processor 1810 executes program instructions stored in main memory 1820. Main memory 1820 stores programs and data that processor 1810 may access. When computer system 1800 starts up, processor 1810 initially executes the program instructions that make up operating system 1824. Operating system 1824 is a sophisticated program that manages the resources of computer system 1800. Some of these resources are processor 1810, main memory 1820, mass storage interface 1830, terminal interface 1840, network interface 1850, and system bus 1860.

Although computer system 1800 is shown to contain only a single processor and a single system bus, those skilled in the art will appreciate that the present invention may be practiced using a computer system that has multiple processors and/or multiple buses. In addition, the interfaces that are used in the preferred embodiment each include separate, fully programmed microprocessors that are used to off-load compute-intensive processing from processor 1810. However, those skilled in the art will appreciate that the present invention applies equally to computer systems that simply use I/O adapters to perform similar functions.

Terminal interface 1840 is used to directly connect one or more terminals 1865 to computer system 1800. These terminals 1865, which may be non-intelligent (i.e., dumb) terminals or fully programmable workstations, are used to allow system administrators and users to communicate with computer system 1800. Note, however, that while terminal interface 1840 is provided to support communication with one or more terminals 1865, computer system 1800 does not necessarily require a terminal 1865, because all needed interaction with users and other processes may occur via network interface 1850.

Network interface 1850 is used to connect other computer systems and/or workstations (e.g., 1875 in FIG. 18) to computer system 1800 across a network 1870. The present invention applies equally no matter how computer system 1800 may be connected to other computer systems and/or workstations, regardless of whether the network connection 1870 is made using present-day analog and/or digital techniques or via some networking mechanism of the future. In addition, many different network protocols can be used to implement a network. These protocols are specialized computer programs that allow computers to communicate across network 1870. TCP/IP (Transmission Control Protocol/Internet Protocol) is an example of a suitable network protocol.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of signal bearing media used to actually carry out the distribution. Examples of suitable signal bearing media include: recordable type media such as floppy disks (e.g., 1895 of FIG. 18) and CD ROM, and transmission type media such as digital and analog communications links.

The embodiments and examples set forth herein were presented in order to best explain the present invention and its practical application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit and scope of the forthcoming claims. For example, while the preferred embodiments are described as having practical application to the allocation of Java objects, the preferred embodiments are not limited to any particular object oriented language.

What is claimed is:

1. An apparatus comprising:
   at least one processor;
   a memory coupled to the at least one processor;
   an object oriented program residing in the memory comprising a plurality of instructions;
   an escape analysis mechanism residing in the memory and executed by the at least one processor, the escape analysis mechanism marking each instruction in the object oriented program that allocates a new object as one of global escape, no escape, and arg escape; and
   an object allocation optimizer residing in the memory and executed by the at least one processor, the object allocation optimizer allocating at least one object that is created by an instruction marked as arg escape by the escape analysis mechanism to an invocation stack frame for a method that directly or indirectly allocates the object.

2. The apparatus of claim 1 further comprising a connection graph tool that generates a connection graph for the objects created by each instruction marked by the escape analysis mechanism.

3. The apparatus of claim 1 wherein the object allocation optimizer comprises an inline stack generator that generates stack information for each instruction marked arg escape.

4. The apparatus of claim 3 wherein the object allocation optimizer comprises an inline stack analyzer that determines from the stack information that an object may be allocated to an invocation stack frame for a method that directly or indirectly allocates the object if the lifetime of the object does not escape the methods that can be successfully inlined.

5. The apparatus of claim 1 wherein the escape analysis mechanism is part of the object allocation optimizer.

6. An apparatus comprising:
   at least one processor;
   a memory coupled to the at least one processor;
   an object oriented program residing in the memory comprising a plurality of instructions;
   an escape analysis mechanism that marks each instruction in the object oriented program that allocates a new object as one of global escape, no escape, and arg escape;
   a connection graph tool that generates a connection graph for the objects created by each instruction marked by the escape analysis mechanism;
   an inline stack generator that generates stack information for each instruction marked arg escape; and
   an inline stack analyzer that determines from the stack information that an object may be allocated to an invocation stack frame for a method that directly or indirectly allocates the object if the lifetime of the object does not escape the methods that can be successfully inlined.

7. A method for allocating objects in an object oriented program to memory, the method comprising the steps of:
   marking each instruction in the object oriented program that allocates a new object as one of global escape, no escape, and arg escape; and
   allocating at least one object that is created by an instruction marked as arg escape to an invocation stack frame for a method that directly or indirectly allocates the object.

8. The method of claim 7 further comprising the step of generating a connection graph for the objects created by each marked instruction.

9. The method of claim 7 further comprising the step of generating stack information for each instruction marked arg escape.

10. The method of claim 9 further comprising the step of determining from the stack information that an object may be allocated to an invocation stack frame for a method that directly or indirectly allocates the object if the lifetime of the object does not escape the methods that can be successfully inlined.

11. A method for allocating objects in an object oriented program to memory, the method comprising the steps of:
   marking each instruction in the object oriented program that allocates a new object as one of global escape, no escape, and arg escape;
   generating a connection graph for the objects created by each marked instruction;
   generating stack information for each instruction marked arg escape; and determining from the stack information that an object may be allocated to an invocation stack frame for a method that directly or indirectly allocates the object if the lifetime of the object does not escape the methods that can be successfully inlined.

12. A program product comprising:

an escape analysis mechanism that marks each instruction in an object oriented program that allocates a new object as one of global escape, no escape, and arg escape;

an object allocation optimizer that allocates at least one object that is created by an instruction marked as arg escape to an invocation stack frame for a method that directly or indirectly allocates the object; and signal bearing media bearing the escape analysis mechanism and the object allocation optimizer.

13. The program product of claim 12 wherein said signal bearing media comprises recordable media.

14. The program product of claim 12 wherein said signal bearing media comprises transmission media.

15. The program product of claim 12 further comprising a connection graph tool borne by the signal bearing media that generates a connection graph for the objects created by each instruction marked by the escape analysis mechanism.

16. The program product of claim 12 wherein the object allocation optimizer comprises an inline stack generator that generates stack information for each instruction marked arg escape.

17. The program product of claim 16 wherein the object allocation optimizer comprises an inline stack analyzer that determines from the stack information that an object may be allocated to an invocation stack frame for a method that directly or indirectly allocates the object if the lifetime of the object does not escape the methods that can be successfully inlined.

18. The program product of claim 12 wherein the escape analysis mechanism is part of the object allocation optimizer.

19. A program product comprising:

an escape analysis mechanism that marks each instruction in an object oriented program that allocates a new object as one of global escape, no escape, and arg escape;

a connection graph tool that generates a connection graph for the objects created by each instruction marked by the escape analysis mechanism;

an inline stack generator that generates stack information for each instruction marked arg escape; and an inline stack analyzer that determines from the stack information that an object may be allocated to an invocation stack frame for a method that directly or indirectly allocates the object if the lifetime of the object does not escape the methods that can be successfully inlined; and signal bearing media bearing the escape analysis mechanism, the connection graph tool, the inline stack generator, and the inline stack analyzer.

20. The program product of claim 19 wherein said signal bearing media comprises recordable media.

21. The program product of claim 19 wherein said signal bearing media comprises transmission media.

* * * * *